United States Patent [19]

Zeigler

[11] 4,090,730
[45] May 23, 1978

[54] GARDEN WEEDING TOOL

[76] Inventor: Philip Carl Zeigler, River Rd., Underhill, Vt. 05489

[21] Appl. No.: 716,948

[22] Filed: Aug. 23, 1976

[51] Int. Cl.² .............................................. A01B 1/16
[52] U.S. Cl. ..................................... 294/50.6; 30/318
[58] Field of Search ................ 294/50.6, 51, 57, 55.5; 172/379; 30/317, 318

[56] References Cited

U.S. PATENT DOCUMENTS

| | | | |
|---|---|---|---|
| D. 208,987 | 10/1967 | Anderson et al. | D8/9 |
| D. 232,015 | 7/1974 | Pontius | D8/11 |
| 1,323,980 | 12/1919 | Hare | 294/51 |
| 1,464,353 | 8/1923 | Crinella | 294/51 |
| 2,070,041 | 2/1937 | Coe | 30/318 |
| 2,352,320 | 6/1944 | Hatch | 294/50.6 |
| 2,787,058 | 4/1957 | Vogel | 30/318 |

Primary Examiner—James B. Marbert
Attorney, Agent, or Firm—Thomas N. Neiman

[57] ABSTRACT

This invention is a hand tool, for weeding or cultivating, consisting of angled handle attached to a blade with a serrated edge. The angle of handle and blade, and the cut of the serrated edge, combine to enable the user to easily slide the blade horizontally under the earth surface and pull the weeds out, rather than cut them off. The blade, according to the depicted embodiments, is made of spring steel, whereas the handle is made of plastic. As disclosed herein only by way of example, the handle supporting shaft is made of forged steel. The shaft is bent at an angle to dispose the blade in a horizontal plane.

3 Claims, 4 Drawing Figures

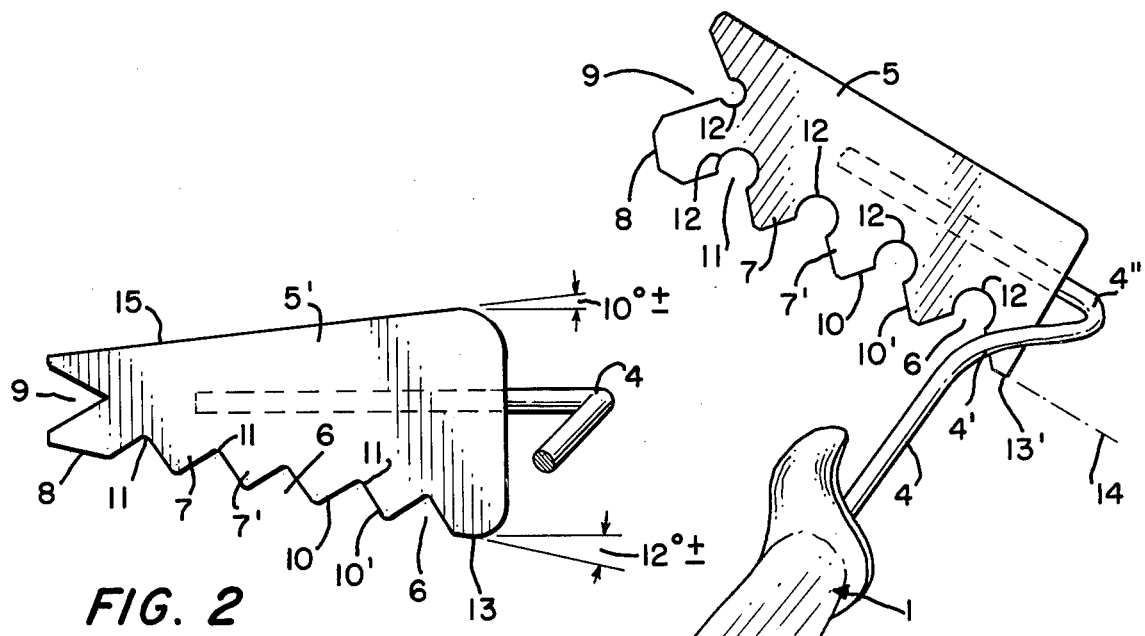
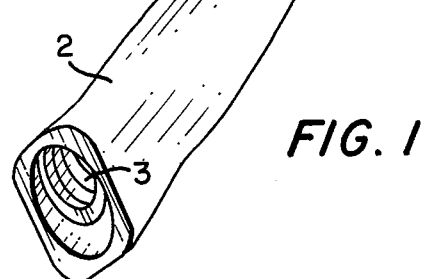
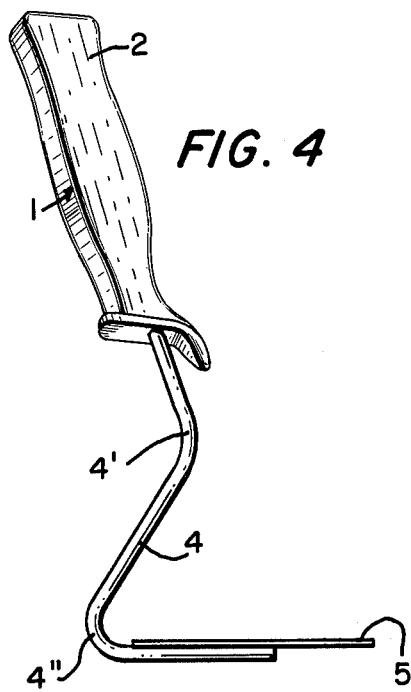
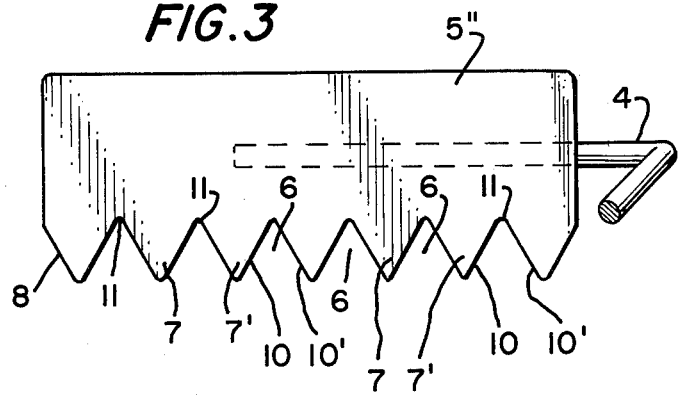

GARDEN WEEDING TOOL

This invention pertains to gardening tools, and in particular to means for removing weeds from the ground. Prior art is exemplified by U.S. Pat. No. 3,942,591 issued to Jafie Brannin, on Aug. 5, 1974, for An Agricultural Implement, and U.S. Pat. No. 2,873,809 issued to E. T. Loomis, for A Cultivating Tool, on Feb. 17, 1959. Such hand tools do not do much more than cut weeds at surface level or just below surface level. This accomplishes little but a delaying action for, if the roots are left in the ground, they will shortly sprout again. What has been needed is a weeding tool which will pull weeds from garden plots and the like. Especially what has been needed is a weed-removing tool which is simple of manufacture, efficient, easy to use by hand, and which can be employed in heretofore inaccessible weed-growth locations, i.e.: between rows of flowers or plants, adjacent to the stalks of plants, etc.

It is the object of this invention to set forth an improved tool for the removal of weeds from soil which avoids the disadvantages, such as those recited, which are inherent in prior tools and their use.

It is another object of this invention to teach a garden weeding tool comprising a blade with a serrated edge and means for supporting and providing leverage to said blade.

Further objects of the invention, as well as the novel features thereof, will become apparent when one studies the following description of embodiments of the invention, taken in conjunction with the accompanying figures in which:

FIG. 1 is a plan view of a preferred embodiment of the garden weeding tool;

FIG. 2 is a plan view of an alternative embodiment of the garden weeding tool showing, only, an alternative form of blade;

FIG. 3 is a plan view of yet another alternative form of blade; and

FIG. 4 is an end elevational view, taken from the right-hand side of FIG. 1, to show a different aspect of the angle with the blade.

As shown in FIG. 1, the garden weeding tool 1, according to a preferred embodiment thereof, comprises a handle 2 with a threaded open end 3. At the opposite end of the handle 2 is a rod like element 4. This element is bent at 4' and 4" to enable the user to hold a blade 5, attached to element 4, horizontal while pulling the handle 2 toward himself. Handle 2 comprises a generally grip-shaped component which has the normal gripping configuration slightly canted or turned left-handedly (assuming the use of the tool by a right-handed person). This canted or turned disposition, together with the bends at 4' and 4" of the rod-like element 4, causes the resultant force of the pull of the tool through the subsurface of the earth, to be directed generally midway along the length of the blade 5. The blade 5 consists of a thin, elongate, flat surfaced component which has V-shaped recesses 6 formed therein, along one lateral edge thereof, the recesses being defined by adjacent, spaced-apart blades 7 and 7'. Blades 7 and 7' form side walls 10 and 10' of the recess, the walls being joined by a recess apex 11. An edge 8 adjoining the lateral edge having the V-shaped recesses, and an end recess 9, is formed with a deflecting angle to permit the user to effectively use the tool right up to contacting engagement with flowers or plants without injuring same. The recess 9, opposite the end to which the shaft 4 is attached, is designed to enable one to use said tool 1 between two closely-planted flowers or plants. By moving the tool in the direction of the lengthwise axis of the blade 5, the narrow width of the blade can move unobtrusively between close flowers or plants to effect weeding.

The blades 7 and 7', upon the tool 1 being "knifed" into the earth, to a shallow depth, and then pulled horizontally forward, gathers to weeds lying in its path and bands them together, in a rather compacted cluster, up against the apexes 11. On further forward movement of the tool 1, the banded or clustered weeds yield from the earth, are pulled therefrom, and carried along in the apexes 11.

To further enhance this "clustering" of the weeds in the apexes 11 — as it is the clustering which lends common strength to the several stalks therein, to overcome the resistance of the roots — arcuate coves 12 are formed in the apexes 11. Coves 12 provide for a greater gathering or clustering volume.

Blades 5' and 5", of FIGS. 2 and 3, perform a similar function like that of blade 5(FIG. 1). However, the latter, blade 5", is of very simple manufacture, the same having the end recess 9 and the coves 12 omitted. Blade 5' is formed with a forward edge 13 which is disposed at an angle (of approximately 12 degrees) from a plane 14 in which the forward edge 13' of blade 5 lies. By this arrangement, blade 5' has an enhanced angle of attack, on initially being addressed to weeds for the unearthing thereof in a swath or pass. So also, the rear or following edge 15 of blade 5' is angularly formed to cause the blade to converge toward the end recess 9. This convergence improves the facility with which the recess 9 can be moved through weeds and brush.

As shown in FIG. 4, with the blade 5 positioned in a horizontal plane (parallel to the surface of the earth) the handle-shaft 4 rises therefrom at an oblique angle. Thus, the blade is supported outwardly or forwardly of the user, and the handle 2 is disposed at a comfortable and advantageous attitude.

More often than not, the tool 1 will be used in embodiments as depicted. In such use the person doing weeding with the tool will be kneeling, or stooping, to be close to the plant life in order to effect a more sure control over the growths to which and around and through which the tool is moved. However, where wide areas of weeding are to be processed, it will be preferred to fix a supplemental handle to the tool, so that the user can pursue the work in a fully erect position. It is for this reason that the outermost end of the handle 2 has a threaded bore 3. Simply by threadedly engaging the bore 3 with a handle extension (viz: a threaded broom handle), the tool can be adapted for use in a standing position.

It will be self-evident to those skilled in this art, taking teaching from my disclosure, that various modifications of the depicted embodiments are possible. The weed-gathering coves 12, of course, can be added to blades 5' and/or 5". Too, the handle-shaft 4 may be fixed along the trailing edges of the several blades; it may be made integral with the upper surface of the blade, rather than the lower surface. Also, obviously, the handle-shaft 4 may be attached "left-handedly" so to speak; i.e. it may be fixed to the opposite end of the blade. All such modifications, and others as will occur to those skilled in this art, are deemed to be within the ambit of my teaching.

Accordingly, while I have described my invention in connection with some specific embodiments thereof, it is clearly to be understood that this is done only by way of example and not as a limitation to the scope of my invention as set forth in the objects thereof and in the claims.

I claim:

1. A garden weeding tool, comprising:

a blade with a serrated edge; and means coupled to said blade for supporting and providing leverage to said blade; wherein said blade has opposite, terminal ends and leading and trailing edges;

said leading edge is said serrated edge;

said coupled supporting means comprises a shaft extending from said blade at an angulation disposing said shaft at an inclination toward said leading edge;

said blade being flat, occupying a single plane and defining an angle between said shaft and said leading edge, of less than ninety degrees of arc, and defining an angle of greater than ninety degrees of arc between said shaft and said trailing edge, in order that said blade may be disposed horizontally when said shaft is held by a tool user forward of and above said blade;

said serrated, leading edge having a plurality of serrations formed therein;

each of said serrations of the plurality thereof being defined by a recess having substantially V-shaped opposed walls, said walls mutually converging inwardly from said leading edge;

said shaft is coupled to one of said terminal ends, and includes a handle for the manipulation of said tool;

said handle comprises a grip-shaped component having a normal gripping configuration which is oriented generally to cause a gripping thereof to be directed generally in transverse of said blade in order that a pulling force applied to said tool will be directed along a plane which is generally intermediate of said leading edge and in traverse of said blade; and said handle has threads formed therein on its furthermost extended end to facilitate the attachment thereto of an extension to said handle.

2. A tool, according to claim 1, wherein: said shaft is coupled to said blade at one end of said blade; and said serrations are provided on a blade end opposite said one end.

3. A tool, according to claim 1, wherein:

each of said recesses opens onto a reentrant or widening cove which terminates said recess, said cove having an arcuate perimeter which comprises more than half of a circle in which to gather and cluster plant growths.

* * * * *